(12) United States Patent
Kumar et al.

(10) Patent No.: US 12,181,308 B2
(45) Date of Patent: Dec. 31, 2024

(54) LOCATION-BASED RADAR, LIDAR AND GCP DATA

(71) Applicant: ZF Friedrichshafen AG, Friedrichshafen (DE)

(72) Inventors: Suraj Plachikaad Suresh Kumar, Friedrichshafen (DE); Mithun Sreekumar, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 518 days.

(21) Appl. No.: 17/295,940

(22) PCT Filed: Nov. 13, 2019

(86) PCT No.: PCT/EP2019/081120
§ 371 (c)(1),
(2) Date: May 21, 2021

(87) PCT Pub. No.: WO2020/104264
PCT Pub. Date: May 28, 2020

(65) Prior Publication Data
US 2022/0011121 A1 Jan. 13, 2022

(30) Foreign Application Priority Data
Nov. 23, 2018 (DE) .................. 10 2018 220 115.3

(51) Int. Cl.
*G01C 21/00* (2006.01)
*G06F 16/29* (2019.01)

(52) U.S. Cl.
CPC .......... *G01C 21/3881* (2020.08); *G06F 16/29* (2019.01)

(58) Field of Classification Search
CPC ............... G01C 21/3881; G06F 16/29
See application file for complete search history.

(56) References Cited

U.S. PATENT DOCUMENTS

| | | | |
|---|---|---|---|
| 5,652,717 A | * | 7/1997 | Miller ............... G06T 17/05 703/6 |
| 8,803,970 B2 | | 8/2014 | Ikeuchi et al. |

(Continued)

FOREIGN PATENT DOCUMENTS

| | | |
|---|---|---|
| DE | 102005063013 A1 | 7/2007 |
| DE | 102008031081 A1 | 1/2010 |

(Continued)

OTHER PUBLICATIONS

International Search Report (English Translation) PCT/EP2019/081120, dated Jan. 31, 2020. (3 pages).

(Continued)

*Primary Examiner* — Jonathan L Sample
*Assistant Examiner* — Mohammed Yousef Abuelhawa
(74) *Attorney, Agent, or Firm* — Dority & Manning, P.A.

(57) ABSTRACT

A method for generating a data set grid (2) containing location-based data includes: providing a data set (1) containing location-based data for a region (5), wherein the location-based data include at least location-based radar data, location-based LIDAR data, and location-based GCP data; providing a grid, which subdivides the region into subregions, having a plurality of grid cells (3, 3'); assigning the location-based data to a grid cell (3, 3'); storing the location-based data, grid cell by grid cell, in a file (6) in each case in such a manner that the file contains the location-based data of a grid cell (3, 3'). A method for transmitting location-based data between a server and a mobile terminal includes: transmitting (V1) a location or a region from the mobile terminal to the server; assigning (V2) the location to a first grid cell (3) of a grid of a region (5); transmitting (V5) a file (6) containing location-based data, which include at least location-based radar data, location-based LIDAR data, (Continued)

and location-based GCP data and belong to the assigned first grid cell (3), from the server to the mobile terminal.

14 Claims, 2 Drawing Sheets

(56) References Cited

U.S. PATENT DOCUMENTS

| | | | |
|---|---|---|---|
| 10,219,111 B1* | 2/2019 | Chen | H04L 51/222 |
| 10,382,890 B1* | 8/2019 | Stirling | H04L 67/568 |
| 2004/0151388 A1 | 8/2004 | Maeda | |
| 2012/0029869 A1* | 2/2012 | Muensterer | G01S 17/89 |
| | | | 702/155 |
| 2013/0147846 A1 | 6/2013 | Kalai et al. | |
| 2015/0106014 A1* | 4/2015 | Choi | G01C 21/3885 |
| | | | 701/532 |
| 2016/0300375 A1* | 10/2016 | Beckett | G06F 16/248 |
| 2018/0113882 A1* | 4/2018 | Stenneth | G06F 16/29 |
| 2018/0211115 A1* | 7/2018 | Klein | G08B 29/188 |
| 2020/0132472 A1* | 4/2020 | Mittal | G06F 16/29 |

FOREIGN PATENT DOCUMENTS

| | | |
|---|---|---|
| DE | 112008002657 B4 | 9/2014 |
| WO | WO 2010/068185 A1 | 6/2010 |

OTHER PUBLICATIONS

German Office Action 102018220115.3, dated Jul. 26, 2019. (10 pages).

Junichi Takaku et al. "High resolution DSM generation from ALOS PRISM—mosaic dataset—" Geoscience and Remote Sensing Symposium (IGARSS), 2012 IEEE International, IEEE, Jul. 22, 2012 (Jul. 22, 2012). pp. 2687-2690, DOI: 10.1109/IGARSS.2012.6350375, ISBN: 978-1-4673-1160-1. XP032468339.

\* cited by examiner

LOCATION-BASED RADAR, LIDAR AND GCP DATA

CROSS-REFERENCE TO RELATED APPLICATIONS

The present application is related and has right of priority to German Patent Application No. 102018220115.3 filed in the German Patent Office on Nov. 23, 2018 and is a nationalization of PCT/EP2019/081120 filed in the European Patent Office on Nov. 13, 2019, both of which are incorporated by reference in their entirety for all purposes.

TECHNICAL FIELD OF THE INVENTION

The present invention relates generally to a method for generating a data set grid containing location-based data and to a method for transmitting location-based data between a server and a mobile terminal.

TECHNICAL BACKGROUND

Web-based navigation applications are known. In this connection, location data of a mobile terminal are frequently transmitted to a central server. On the basis of the location, the central server selects a suitable file containing a map and transmits the file to the mobile terminal, which evaluates the file for navigation purposes.

It is to be assumed that, in the future, radar, LIDAR, and GCP data, in addition to map data, are also to be transmitted from a central server to a mobile terminal within the scope of web-based navigation applications.

SUMMARY OF THE INVENTION

Against this background, example aspects of the invention provide a method, which enables an optimized transmission of radar, LIDAR, and GCP data.

Accordingly, the following are provided:

A method for generating a data set grid containing location-based data, having at least the following steps: providing a data set containing location-based data for a region, wherein the location-based data include at least location-based radar data, location-based LIDAR data, and location-based GCP data; providing a grid, which subdivides the region into subregions, having a plurality of grid cells; assigning the location-based data to a grid cell; and storing the location-based data, grid cell by grid cell, in a file in each case in such a manner that the file contains the location-based data of a grid cell, wherein the files stored grid cell by grid cell form the data set grid; and a method for transmitting location-based data between a server and a mobile terminal, having at least the following steps: transmitting a location or a region from the mobile terminal to the server; assigning the location to a first grid cell of a grid of a region; and transmitting a file containing location-based data, which include at least location-based radar data, location-based LIDAR data, and location-based GCP data and belong to the assigned first grid cell, from the server to the mobile terminal.

Motor vehicles within the scope of example aspects of this patent application are engine-driven land vehicles. These also include rail vehicles.

"Real time" means that the method runs simultaneously with reality.

A data set encompasses a group of data. In this application, a data set includes at least radar data, LIDAR data, and GCP data.

A grid subdivides data into grid cells. Corner points and edge points of the grid cells are also referred to as grid points. The distance between two grid points is referred to as step width. The data can be subdivided with regard to any number of parameters. One example of a grid of the earth's surface is a grid of latitude and longitude. It is understood that other grids of the earth's surface can also be generated, for example, in another coordinate system. Storing grid cell by grid cell means that data are stored and are retrievable grid cell by grid cell.

In a grid having a constant step size, all grid cells in the coordinate system of the grid underlying the grid are of equal size. In a grid having different step sizes, the grid cells have different sizes. The step size can therefore be set locally, for example, on the basis of a resolution of the data in the grid. In this regard, one also speaks of step size control.

A data set grid is therefore a data set, the data of which were subdivided into grid cells.

Location-based data are data that contain location information. For example, spatial-temporal data, which establish a correlation between a piece of location information and the time, are location-based data.

Radar (Radio Detection and Ranging) is the term for various detection and positioning methods and devices on the basis of electromagnetic waves in the radio frequency range (radio waves). A radar device is a device that emits electromagnetic waves in a bundled manner, receives and evaluates the echoes reflected by objects. In this way, information regarding the objects can be obtained. Usually, this is a position finding (determination of distance and angle). The following information, inter alia, can be obtained from the received waves reflected by the object: the angle and the distance to the object; the relative movement between the transmitter and the object; the distance and the absolute speed of the object; contours or images of the object.

LIDAR (Light Detection and Ranging), also known as LADAR (Laser Detection and Ranging), is a method related to radar for optical distance and speed measurement and for the remote measurement of atmospheric parameters. Laser beams are utilized instead of radio waves as in the case of radar.

GCP (Ground Control Point) data are also referred to as control points or reference points. They are utilized as orientation points in a measurement image. These are points in the terrain, the position of which in an appropriate (terrain) coordinate system is known and which are unambiguously detectable in the measurement image. A distinction is made between three types of GCP data: Full control points, about which the spatial coordinates X, Y, and Z are known; position control points, about which the position coordinates X and Y are known; and height control points, about which the vertical coordinate Z is known.

A region is, for example, one or multiple continent(s), a country, or a province.

A navigation software calculates, with the aid of position determination (satellite, radio, GSM, or an inert or autonomous system) and geographic information (topographic maps, road maps, aeronautical or nautical charts), a navigation to a selected location or a route with consideration for desired criteria.

Mobile terminals are devices, which, due to size and weight, are portable or are mounted in a mobile object, for example, a vehicle and, thereby, are usable in a mobile manner. One example of a mobile terminal is a navigation device, a smartphone, or a PDA.

A server is a computer program or a computer, which makes computer functionalities available, such as utilities, data, or other resources, so that other computers or clients can access these, usually via a network.

A boundary region of a grid cell is a region in the proximity of the edge of the grid cell. The boundary region can be absolutely predefined, for example, the region having a distance of, at most, five hundred meters (500 m) to the edge of the grid cell, or predefined in relation to the grid cell, for example, the region having a distance of, at most, three percent (3%) of the length of the grid cell to the edge of the grid cell.

Computer program products generally include a sequence of commands, by which the hardware, with the program loaded, is prompted to carry out a certain method, which leads to a certain result.

A file format defines the syntax and semantics of data within a file. It therefore represents a bidirectional mapping of information onto a one-dimensional binary memory.

A data carrier, data memory, or memory medium is utilized for storing data.

Example aspects of the invention adapt a data set containing location-based radar data, LIDAR data, and GCP data in an application-specific manner with regard to a region covered by the data set.

On the basis thereof, data packets can be made available in the Internet, which a user can download via a mobile terminal. It is therefore ensured that a user also has access to high-resolution data sets via the Internet and that download of the high-resolution data sets can be accelerated due to an appropriate reduction of the data size.

According to a preferred example refinement of the invention, the grid has a constant step size. Therefore, the computing capacity of the method can be reduced, since the step size does not need to be calculated separately via adaptive step size control, but rather is predefined.

It can be provided that multiple data set grids are made available for a region, each data set grid having a constant step size, wherein the step sizes of the data set grids differ from one another.

Alternatively, it can be advantageous when the grid has different step sizes. In this case, the step size can be set during the generation of the grid. For example, it can be provided that the grid has a smaller step size in an urban area than in a rural area.

It is useful, both for grids having a constant step size and for grids having different step sizes, when a grid is selected with regard to a size of the grid cells and/or with regard to a number of the grid cells.

Accordingly, in the case of a constant step size, it can be determined, for example, that the region is subdivided into a certain number of grid cells.

In the case of a variable step size, it can be determined, for example, that a subregion of the region is subdivided into a certain number of grid cells, or that a grid cell is subdivided into further secondary grid cells, or that multiple grid cells are combined to form one grid cell.

This is particularly advantageous when the location of a grid cell makes it possible to predict a conceivable speed range, with which a mobile terminal could move in the grid cell. For example, it is useful to increase the size of the grid cell when it is to be expected that mobile terminals move in the grid cell at a high speed. If necessary, the data resolution can also be reduced in this case, in order to compensate for losses in the transmission time.

According to a preferred example refinement of the invention, the file is set up to be evaluated by a navigation software of a mobile terminal. It can therefore be guaranteed that the navigation software has on-line access to the data set grid.

According to a preferred example refinement of the transmission method, the transmitted location corresponds to the location of the mobile terminal. Therefore, a transmission method can be made available for real-time applications. This means, the transmission method does not need to be carried out in advance of an application.

Moreover, it is useful when it is ascertained on the server side when the mobile terminal is located in a boundary region of a first grid cell. Computing power can therefore be offloaded from the mobile terminal to the server. In particular, it is not necessary for the position of a mobile terminal within a grid cell to be monitored by the mobile terminal.

It is also useful when, on the server side, at least one next grid cell adjacent to the first grid cell, within which a future location of the mobile terminal could be situated, is ascertained, and the location-based data of the at least one next grid cell are transmitted from the server to the mobile terminal. It can therefore be guaranteed that the download of a next grid cell is automatically started. The situation can therefore be prevented, in which no relevant location-based data are available to the mobile terminal after a grid cell has been exited.

According to a preferred example refinement of the invention, moreover, a speed of the mobile terminal is ascertained. Therefore, for example, the remaining time in a grid cell can be estimated. This is advantageous, for example, in order to set a transmission speed or a transmission start time for transmitting the file.

According to a preferred example refinement of the invention, moreover, a size and/or a data resolution of a grid cell to be transmitted are/is selected. For example, it can be provided that a data resolution is reduced when a high speed of the mobile terminal is ascertained.

According to a preferred example refinement of the invention, before the file is transmitted, a suitable file format is selected and the file is converted, if necessary, into the file format. Therefore, the transmission method can also be retrieved by terminals that utilize different file formats and it is not necessary to provide a file containing location-based data of a region in multiple file formats. Instead, it is conceivable to store the file in a compressed file format and convert the file, on the server side or the terminal side, into a readable file format.

According to a preferred example refinement of the invention, a transmission speed of the file containing location-based data is estimated or ascertained, and the data resolution of the file and/or a size of the grid cell are/is adapted on the basis of the transmission speed. The situation can therefore be prevented, in which, due, for example, to sparse network coverage, the transmission of the file is delayed to such an extent that the mobile terminal has exited a grid cell before the download of the next grid cell has been completed.

It is understood that advantageous steps of a method for generating a data set grid can also be carried out, alternatively, within the scope of example aspects the transmission method. For example, it is also conceivable that the transmission method controls a step size of a grid cell when a data set grid having a constant step size has been generated. Therefore, advantageous steps of a transmission method may possibly also be carried out already within the scope of a method for generating a data set grid. For example, it can be provided that a data set grid contains information regarding a known network coverage, whereupon a possible transmission speed can be estimated. In this case, it is conceivable to adapt the size or the data resolution of grid cells as a function of the network coverage.

Provided the network coverage of an area is stored in a data set grid, the start time of a transmission method can also be adapted on the basis of the network coverage.

It is understood that data carriers, on which a data set grid is stored with a method as described above, are advantageous.

BRIEF DESCRIPTION OF THE DRAWINGS

Example aspects of the present invention are explained in greater detail in the following with reference to the exemplary embodiments described in the diagrammatic figures of the drawings, in which.

Figure 1:
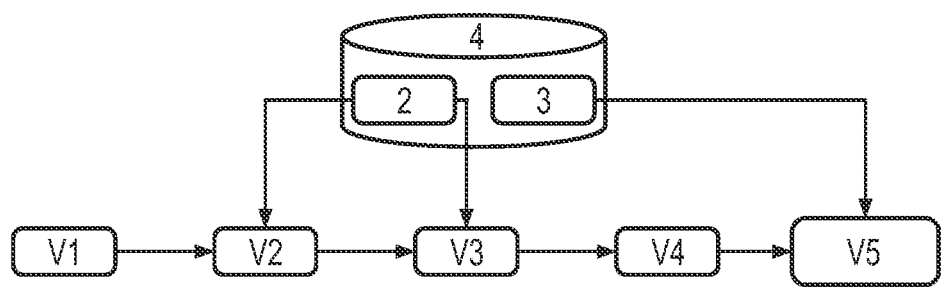
FIG. 1 shows a diagrammatic block diagram of an example embodiment of the invention.

The attached drawings are to impart a further understanding of the embodiments of the invention. The drawings illustrate embodiments and are utilized, in conjunction with the description, for explaining principles and concepts of the invention. Other embodiments and many of the aforementioned advantages result with respect to the drawings. The elements of the drawings are not necessarily shown true to scale with respect to one another.

In the figures of the drawings, identical, functionally identical, and identically acting elements, features, and components—unless described otherwise—are each provided with the same reference characters.

DETAILED DESCRIPTION OF THE INVENTION

FIG. 1 shows a method for transmitting location-based data between a server and a mobile terminal according to an example embodiment of the invention.

In the step V1, a location, for example, on the basis of GPS data, and, optionally, a speed are transmitted from the mobile terminal to the server.

In the step V2, a first grid cell 3 of a grid of a region 5 is assigned to the location. For this purpose, data on the grid, which are stored on a memory 4, are made available.

In the step V3, it is ascertained on the server side whether the mobile terminal is located in a boundary region of the first grid cell 3. For this purpose, data on the grid, which are stored on a memory 4, are made available.

In the step V4, at least one next grid cell 3' adjacent to the first grid cell 3 and within which a future location of the mobile terminal could be situated is ascertained on the server side.

In the step V5, a file 6 containing location-based data, which include at least location-based radar data, location-based LIDAR data, and location-based GCP data and belong to the first grid cell 3 and the next grid cell 3', is transmitted from the server to the mobile terminal. For this purpose, the server retrieves the file 6 for the grid cell 3 and 3' from the memory 4.

Figure 2:
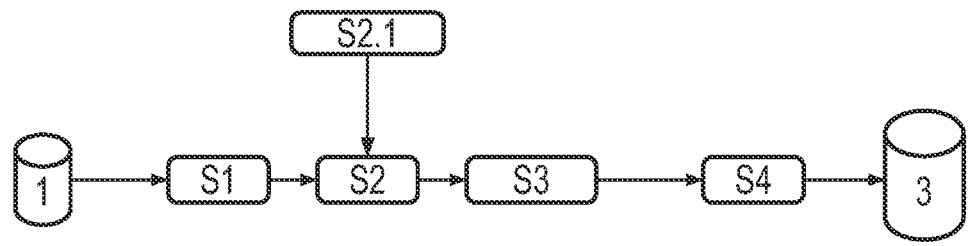
FIG. 2 shows a diagrammatic block diagram of an example embodiment of the invention.

FIG. 2 shows a method for generating a data set grid 2 according to an example embodiment of the invention.

In the step S1, a data set 1 containing location-based data for a region 5 is made available. The location-based data include radar data, LIDAR data, and GCP data.

In the step S2.1, a grid is selected or generated with regard to a size of the grid cells and/or with regard to a number of the grid cells. In the step S2, the selected grid is made available. The grid subdivides the region 5 into subregions having a plurality of grid cells, for example, 3 and 3'.

In the step S3, the location-based data are assigned to one grid cell in each case.

In the step S4, the location-based data are stored, grid cell by grid cell, in a file 6 in each case in such a manner that the file 6 contains the location-based data of a grid cell 3, 3'. Multiple files 6 form a data set grid 2.

Figure 3:
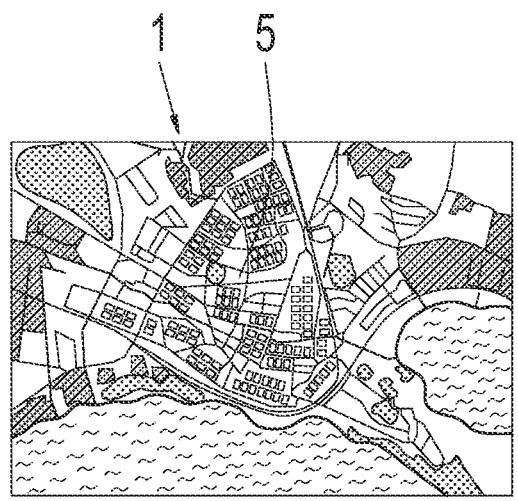
FIG. 3 shows a schematic of data according to an example embodiment of the invention.

In FIG. 3, a data set 1 containing location-based data on a region 5 is graphically represented.

Figure 4:
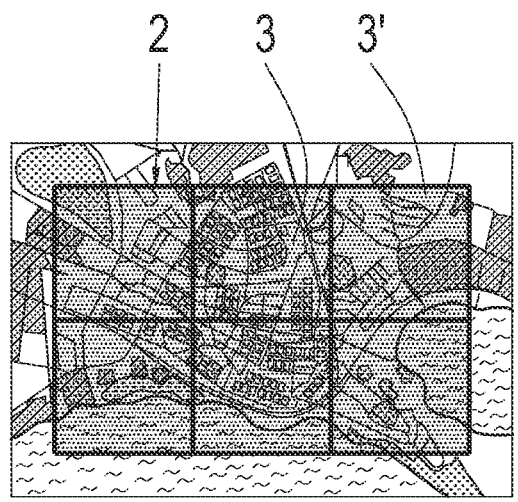
FIG. 4 shows a schematic of data according to an example embodiment of the invention.

In FIG. 4, a data set grid 2 containing data on multiple grid cells, for example, 3 and 3', is graphically represented.

Figure 5:
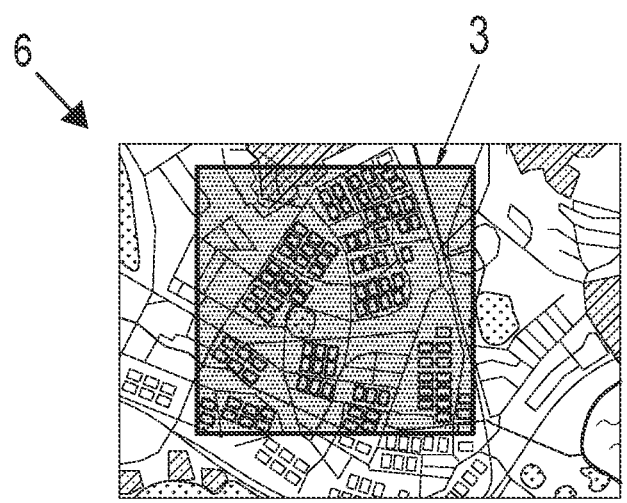
FIG. 5 shows a schematic of data according to an example embodiment of the invention.

In FIG. 5, a file 6 related to a grid cell 3 is graphically represented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 data set
2 data set grid
3 grid cell
3' grid cell
4 memory
5 region
6 file

The invention claimed is:

1. A method for generating a data set grid (2) containing location-based data, comprising:
   providing a data set (1) containing location-based data for a region (5), the location-based data comprising location-based radar data, location-based LIDAR data, and location-based GCP data;
   providing a grid, which subdivides the region into subregions, having a plurality of grid cells (3, 3');
   assigning the location-based data to a respective grid cell (3, 3'); and
   storing the location-based data, grid cell by grid cell, in a respective file (6) such that each of the files (6) contains the respective location-based data of the grid cell (3, 3'), wherein the files (6) stored grid cell by grid cell form the data set grid (2), and each of the files (6) is transmittable via a wireless network to a mobile terminal for real time navigation.

2. The method of claim 1, wherein the grid has a constant step size.

3. The method of claim 1, wherein the grid has different step sizes.

4. The method of claim 1, further comprising selecting the grid (S2.1) with respect to a size of the grid cells (3, 3'), with respect to a number of the grid cells (3, 3'), or with respect to both the size of the grid cells (3, 3') and the number of the grid cells (3, 3').

5. The method of claim 4, wherein the grid is selected depending on a location.

6. The method of claim 1, wherein the file (6) is configured to be evaluated by a navigation software of a mobile terminal.

7. A method for transmitting location-based data between a server and a mobile terminal, comprising:
   transmitting (V1) a location from the mobile terminal to the server;
   assigning (V2) the location to a first grid cell (3) of a grid of a region (5); and
   transmitting (V5), via a wireless network, a file (6) containing location-based data belonging to the assigned first grid cell (3) from the server to the mobile terminal for real time navigation,
   wherein the location-based data comprises location-based radar data, location-based LIDAR data, and location-based GCP data.

8. The transmission method of claim 7, wherein the transmitted location corresponds to the location of the mobile terminal, and the method further comprises ascertaining the location with the server when the mobile terminal is located in a boundary region of the first grid cell (3).

9. The transmission method of claim 8, further comprising:
   ascertaining at least one next grid cell (3') adjacent to the first grid cell (3) with the server, the at least one next grid cell (3') corresponding to a predicted future location of the mobile terminal; and
   transmitting the location-based data of the at least one next grid cell (3') from the server to the mobile terminal.

10. The transmission method of claim 7, further comprising ascertaining a speed of the mobile terminal.

11. The transmission method of claim 7, further comprising selecting a size, a data resolution, or both the size and data resolution of the grid cell (3, 3') of the file (6) to be transmitted.

12. The transmission method of claim 7, further comprising, before the file (6) is transmitted, selecting a suitable file format and converting the file (6) into the suitable file format.

13. The transmission method of claim 7, further comprising:
   estimating or ascertaining a transmission speed of the file (6) containing location-based data; and
   adapting a data resolution of the file (6), a size of the grid cell (3,3'), or both the data resolution of the file (6) and the size of the grid cell (3,3') based on the transmission speed.

14. A data carrier, on which the data set grid (2) generated according to the method of claim 1, is stored.

* * * * *